J. W. BUTLER.
TALLY MACHINE.
APPLICATION FILED FEB. 27, 1914.

1,247,635.

Patented Nov. 27, 1917.
11 SHEETS—SHEET 1.

Witnesses
Lo. B. James
May Barnes

Inventor
Junius W. Butler
By Geo. W. Sues.
Attorney

J. W. BUTLER.
TALLY MACHINE.
APPLICATION FILED FEB. 27, 1914.

1,247,635.

Patented Nov. 27, 1917.
11 SHEETS—SHEET 3.

Witnesses
L. B. James
May Barnes.

Inventor
Junius W. Butler
By Geo. W. Lus
Attorney

J. W. BUTLER.
TALY MACHINE.
APPLICATION FILED FEB. 27, 1914.

1,247,635.

Patented Nov. 27, 1917.
11 SHEETS—SHEET 4.

Witnesses
L. B. James
May Barnes

Inventor
Junius W. Butler
By Geo. W. Sues
Attorney

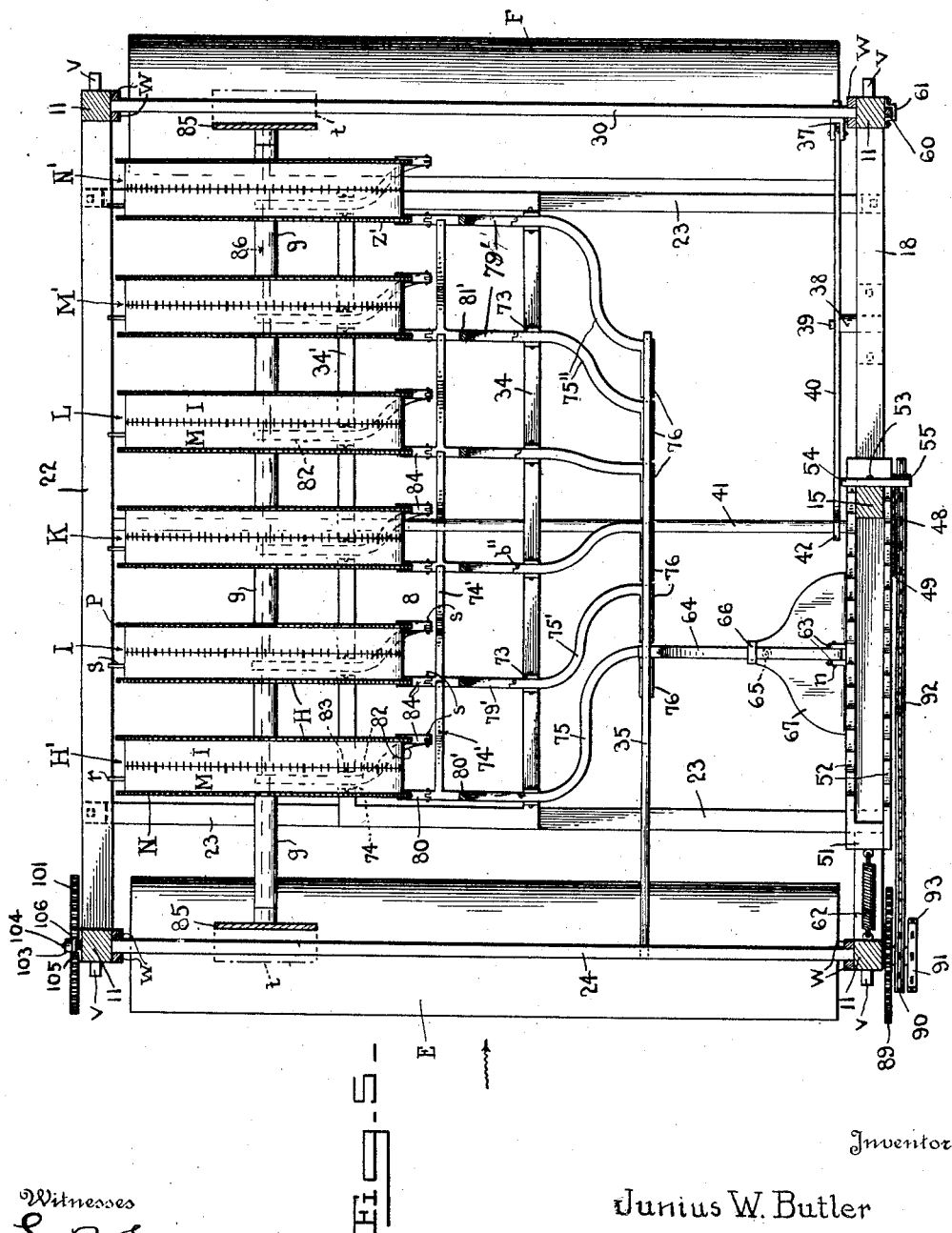

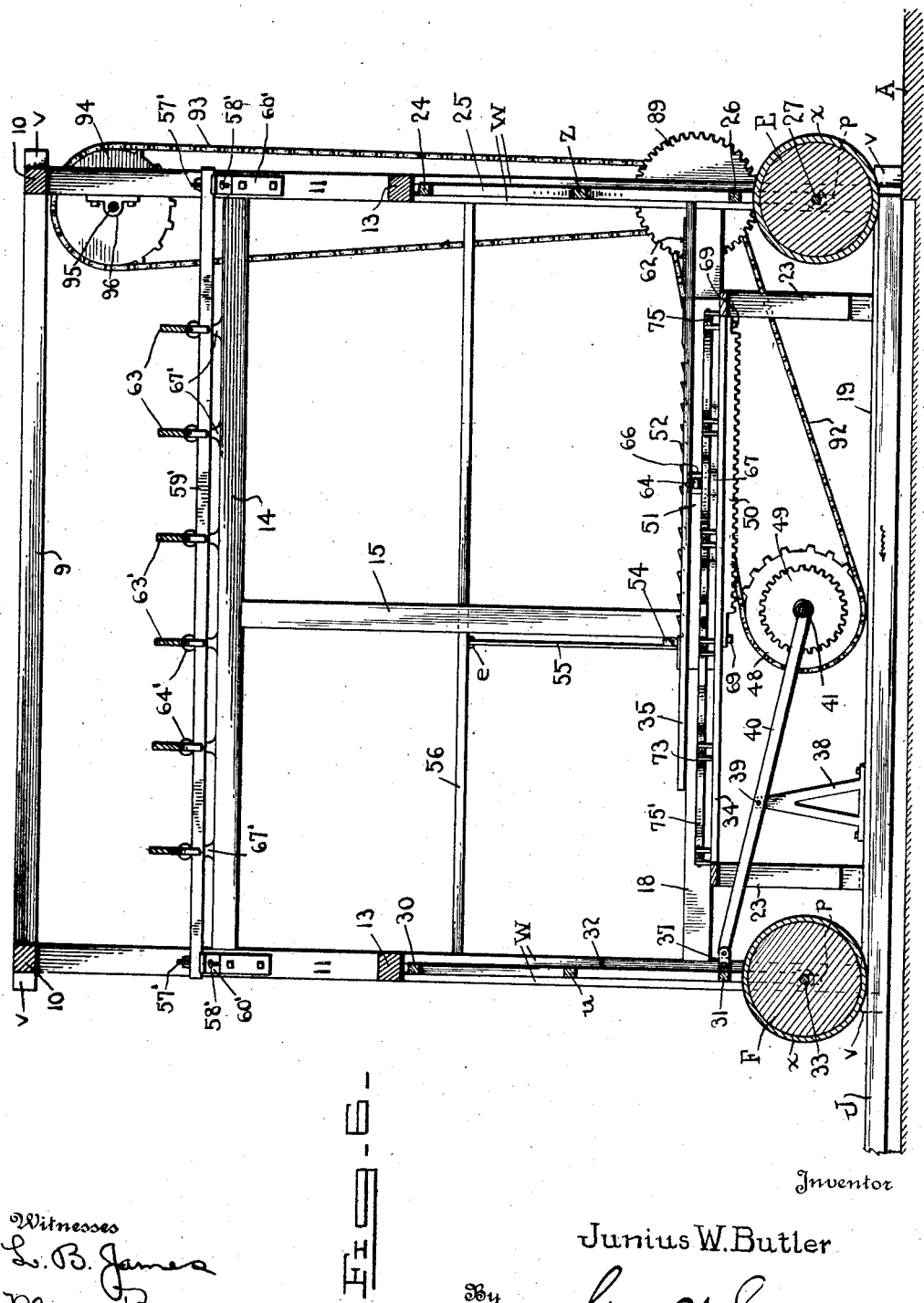

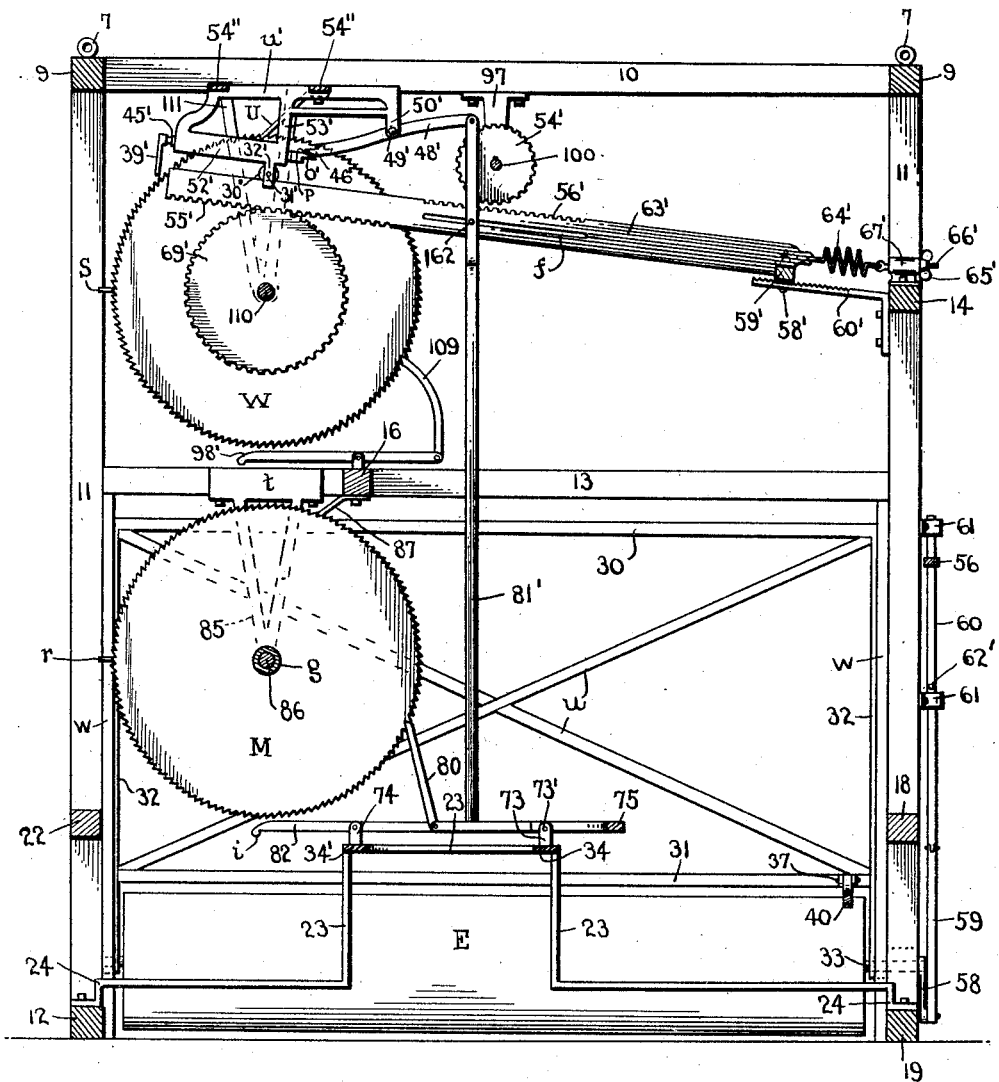

J. W. BUTLER.
TALLY MACHINE.
APPLICATION FILED FEB. 27, 1914.
1,247,635.
Patented Nov. 27, 1917.
11 SHEETS—SHEET 8.
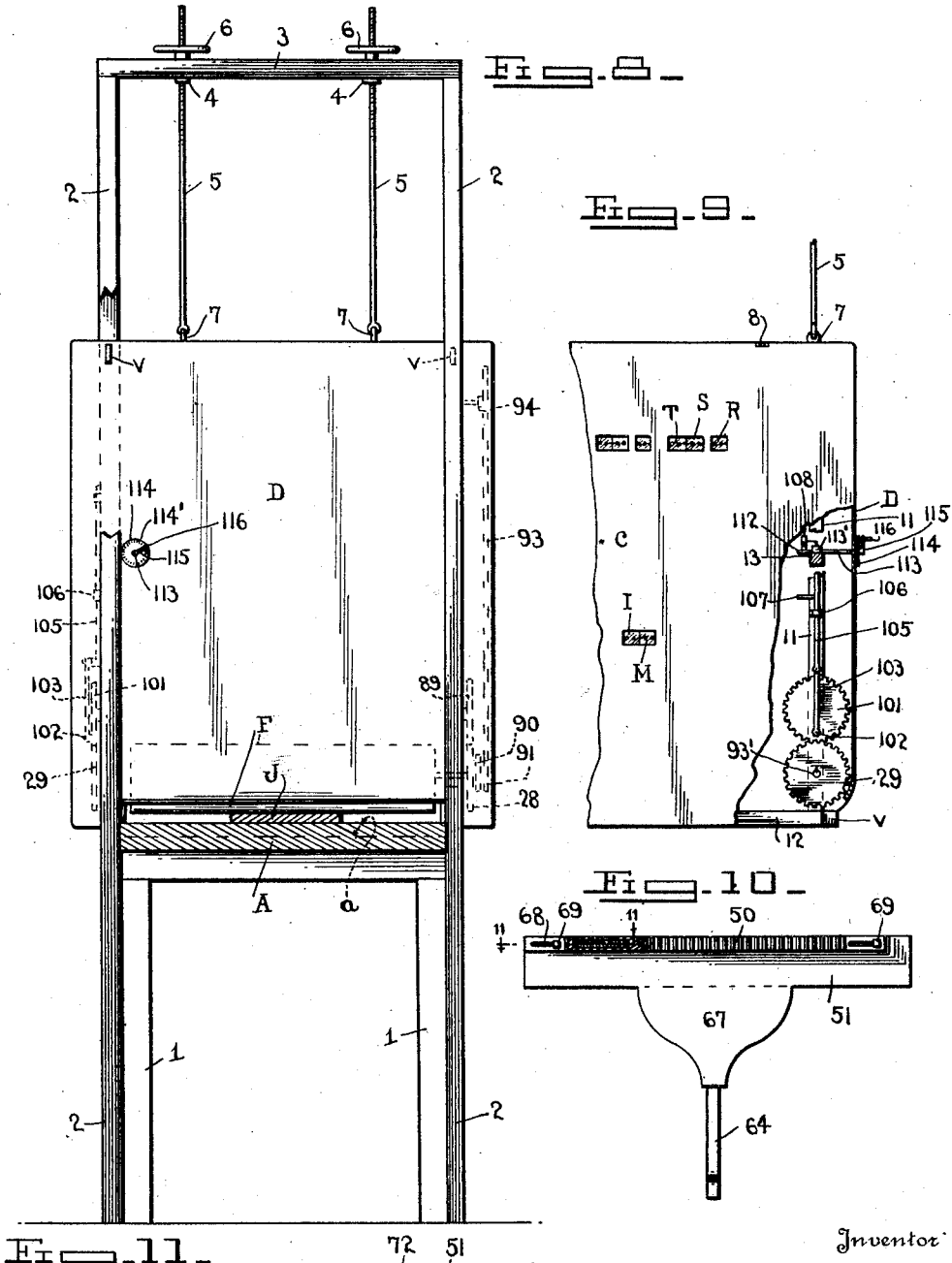
Witnesses
L. B. James
May Barnes
Inventor
Junius W. Butler
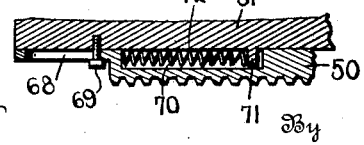
By Geo. W. Sule,
Attorney

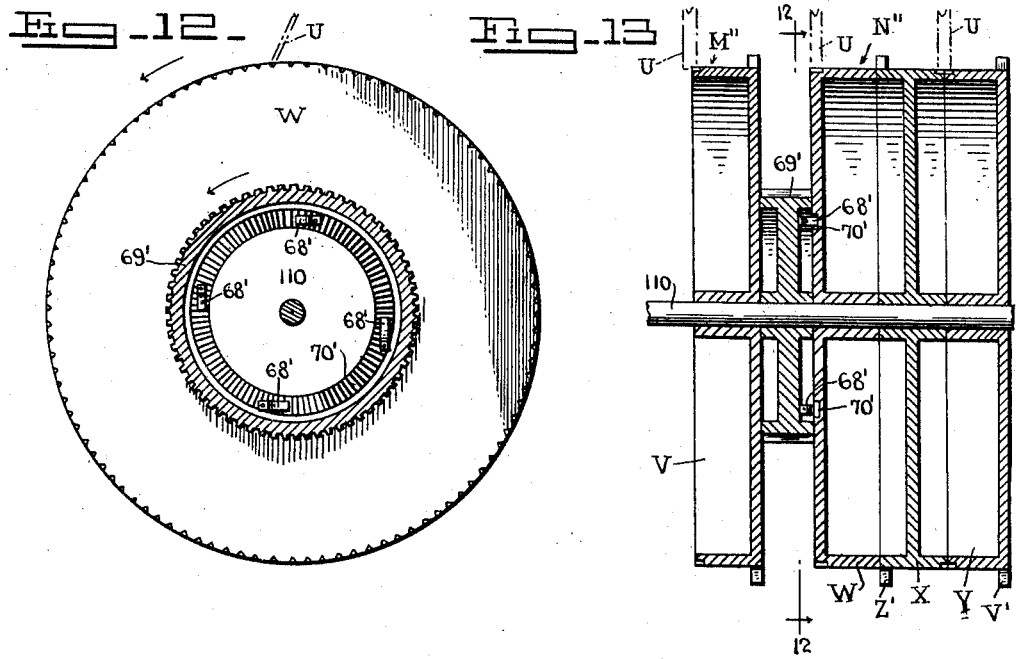
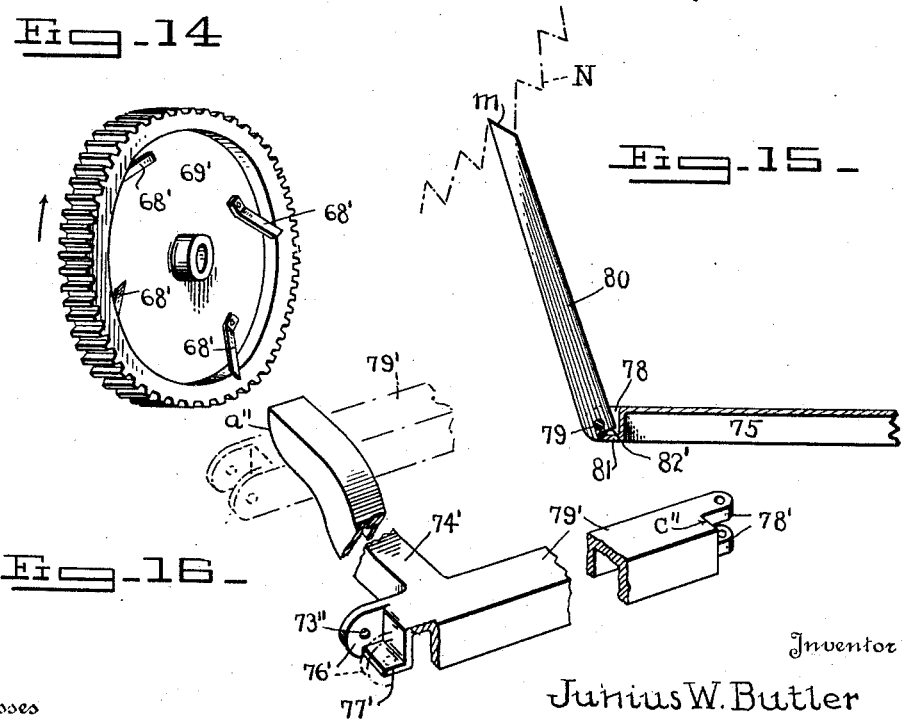

J. W. BUTLER.
TALLY MACHINE.
APPLICATION FILED FEB. 27, 1914.
1,247,635.
Patented Nov. 27, 1917.
11 SHEETS—SHEET 10.
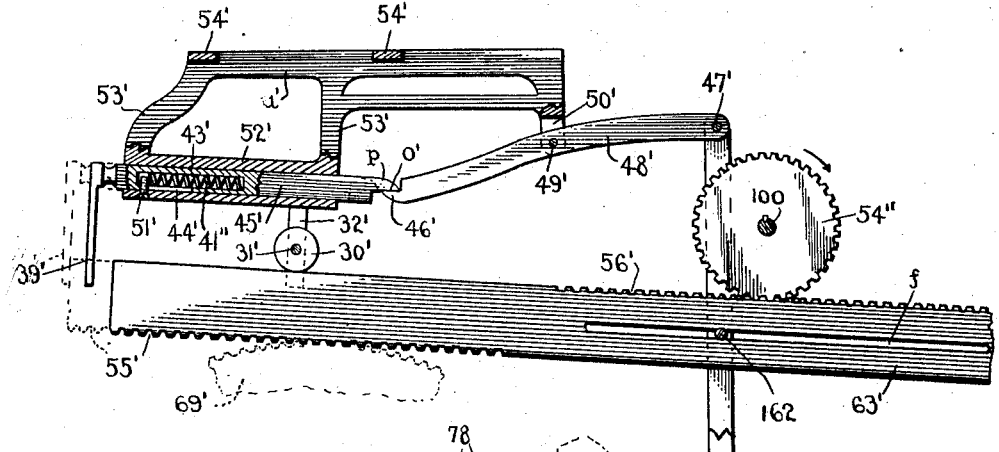
Fig. 17.
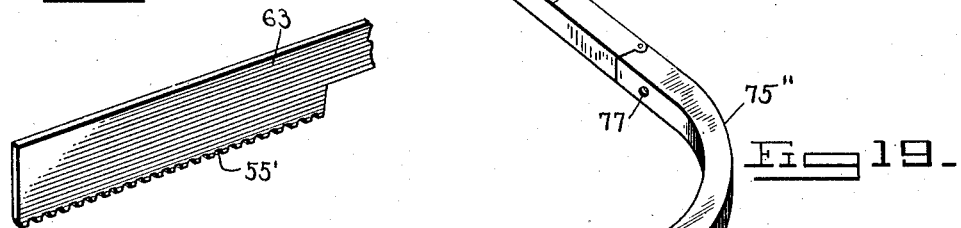
Fig. 18.
Fig. 19.
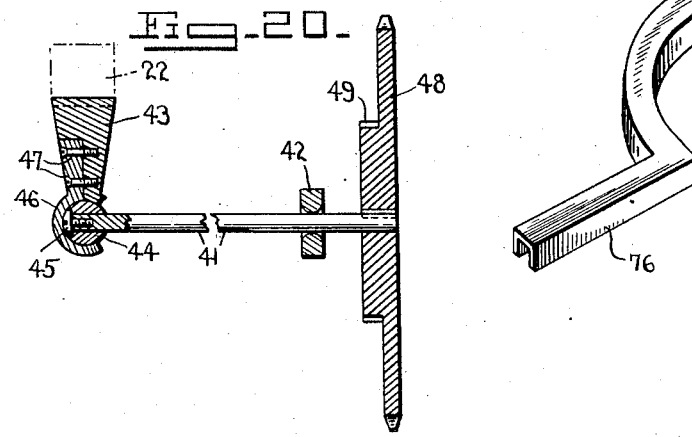
Fig. 20.
Witnesses
L. B. James
May Barnes
Inventor
Junius W. Butler
By Geo. W. Sues
Attorney

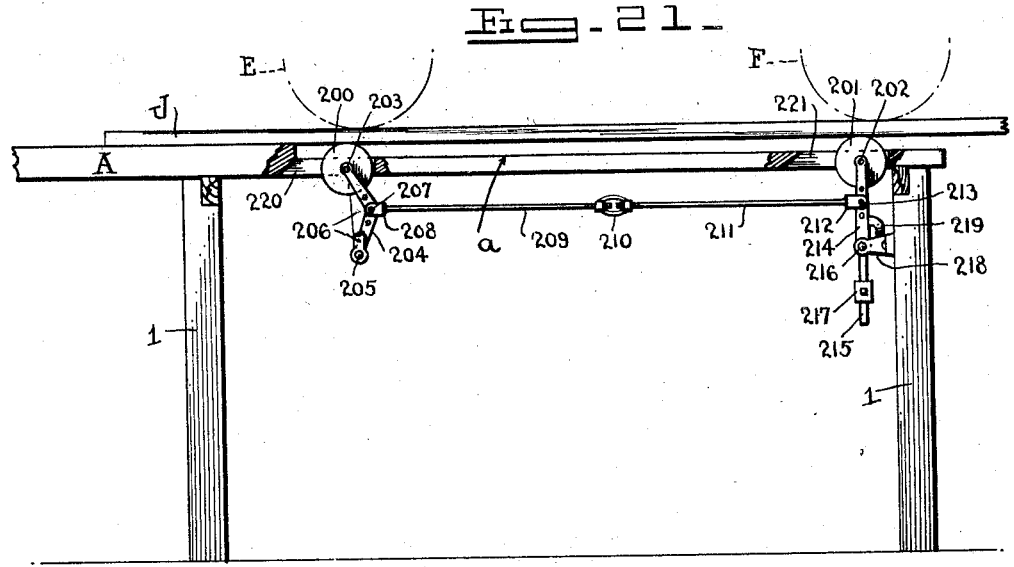
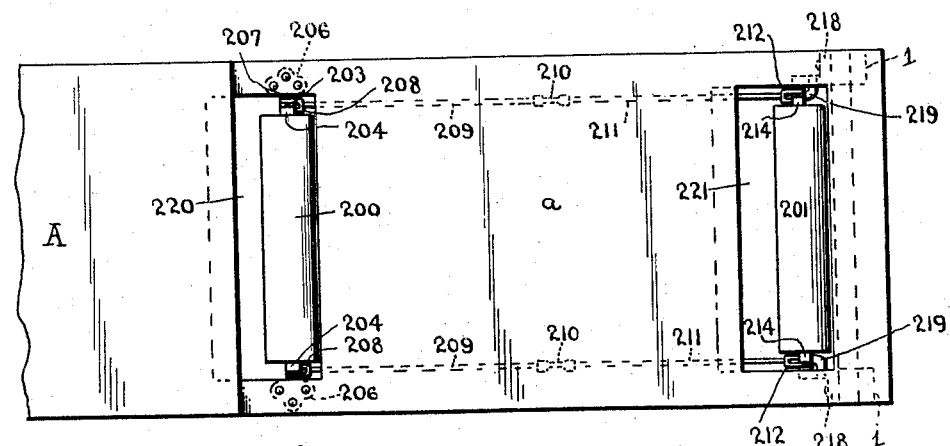
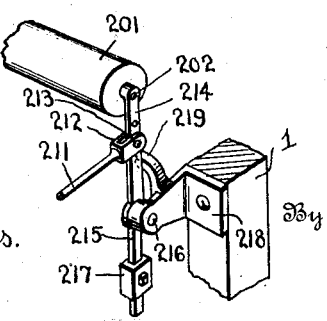

UNITED STATES PATENT OFFICE.

JUNIUS W. BUTLER, OF SALEMBURG, NORTH CAROLINA, ASSIGNOR OF ONE-HALF TO CHARLES S. ROYAL, OF SALEMBURG, NORTH CAROLINA.

TALLY-MACHINE.

1,247,635.  Specification of Letters Patent.  Patented Nov. 27, 1917.

Application filed February 27, 1914. Serial No. 821,460.

*To all whom it may concern:*

Be it known that I, JUNIUS W. BUTLER, a citizen of the United States, and a resident of Salemburg, in the county of Sampson and State of North Carolina, have invented certain new and useful Improvements in Tally-Machines, of which the following is a specification, reference being had to the accompanying drawings, forming a part of this specification.

This invention relates to certain new and useful improvements in counting machines, and comprises a tally machine capable of providing an accurate count of the total number of boards of a standard length and of a given width and thickness, passing under the machine.

The primary object of the invention is the provision of a machine capable of tallying pieces of timber of a known width and thickness passing beneath the machine, regardless of the number of feet in each board.

Another object is the provision of a machine capable of counting the total number of pieces of timber of a known width and thickness and counting the number of the different lengths upon a separate register, regardless of the number of feet contained in each board.

Another object is to provide a machine capable of tallying pieces of timber of a known width and thickness and counting the length in feet and inches and the number of square feet contained in each length upon a separate set of registers, regardless of the linear feet contained in each piece.

Another object is to provide a machine that will register the total number of feet of lumber dressed.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views:

Fig. 5 is a horizontal sectional view on line 5, 5, of Fig. 4;

Fig. 6 is a vertical longitudinal sectional view on line 6, 6, of Fig. 4;

Fig. 7 is a vertical cross section on line 7, 7, of Fig. 3;

Fig. 8 is an end view with parts broken away of the machine with the slide table or plane mill in section;

Fig. 9 is a portion of the side opposite to that shown in Fig. 1, the casing of which is partly broken away to illustrate a portion of the mechanism for operating the total register;

Fig. 10 is a bottom plan view of the carriage with the slide thereon partly broken away;

Fig. 11 is a section on line 11, 11, of Fig. 10;

Fig. 12 is a detail sectional view on line 12, 12, of Fig. 13, showing one of the upper registering wheels;

Fig. 13 is a vertical sectional view of a series of the upper registering wheels;

Fig. 14 is a detailed perspective of one of the ratchet gears used in the upper register;

Fig. 15 is a detailed sectional view of one of the pawls;

Fig. 16 is a detailed view of one of the keys used in the lower section of registers;

Fig. 17 is a detail of the latch for locking the upper registers;

Fig. 18 is a detailed perspective of one of the rack bars which manipulate the upper register;

Fig. 19 is a detailed perspective view of one of the keys used in the lower registers;

Fig. 20 is a detailed sectional view of the carriage operating gear and bars connected thereto;

Fig. 21 shows a side elevational view disclosing the board dropping mechanism.

Fig. 22 is a top view of Fig. 21.

Fig. 23 shows a detail of one of the levers and stop arms.

Figure 1:
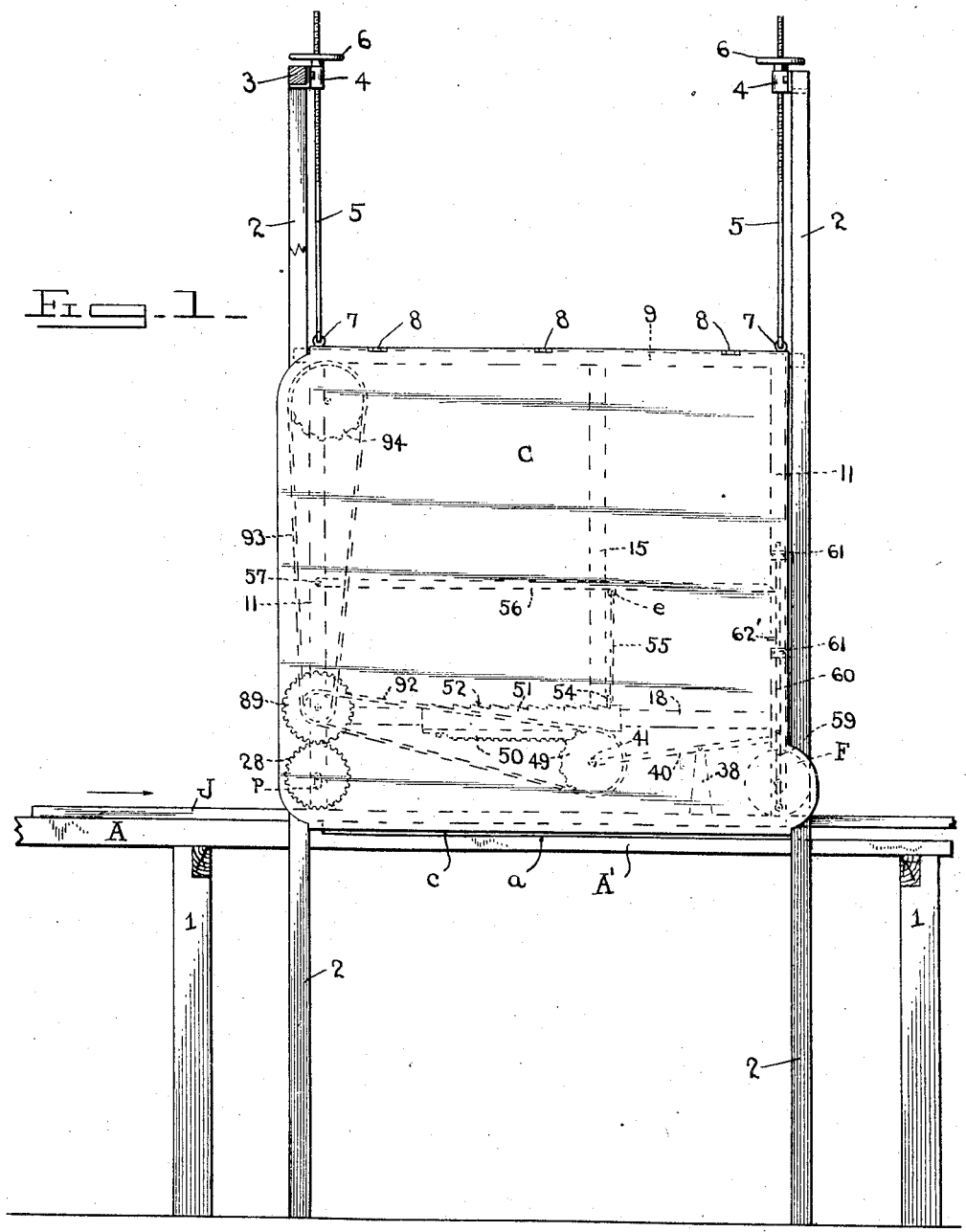
Figure 1 is a side elevation of the machine, with parts broken away.

In my present invention I provide a machine that will give correct piece tally at the outlet of a planing machine or dressing machine, giving the length in feet of the boards passing through the planing machine, so that boards of various widths and length may be accurately piece tallied.

In the accompanying drawings, the letter A, designates a conventional illustration of the lumber slide of a milling machine, which is continued in the table A'. The upper face $a$, of the table A', is a suitable distance below the upper face of the lumber slide, as indicated in Figs. 1 and 6, to provide a drop.

The registering mechanism is held within a frame slidably held between the standards 2, 2, which are secured at their upper ends by means of the top bars 3. In the drawings, the end of the lumber slide is shown as supported by means of the legs 1, 1.

As shown the cross bars 3 have secured to them the sleeves 4, within which slide the adjusting screws 5, which at their upper ends carry the hand wheels 6, this construction being clearly shown in Figs. 1 and 8. At their lower ends these screws 5 engage the eyes 7 secured to the frame carrying the registering mechanism.

This frame upon one side comprises the upper side bar 9, the intermediate bar 14, the side bar 18 and the base bar 19, shown in Fig. 7, these bars being secured to two corner bars 11. Upon the opposite side I employ an upper side bar 9, a side bar 22, located near the lower end and the base bar 12, this also being connected to two corner bars 11.

Figure 4:
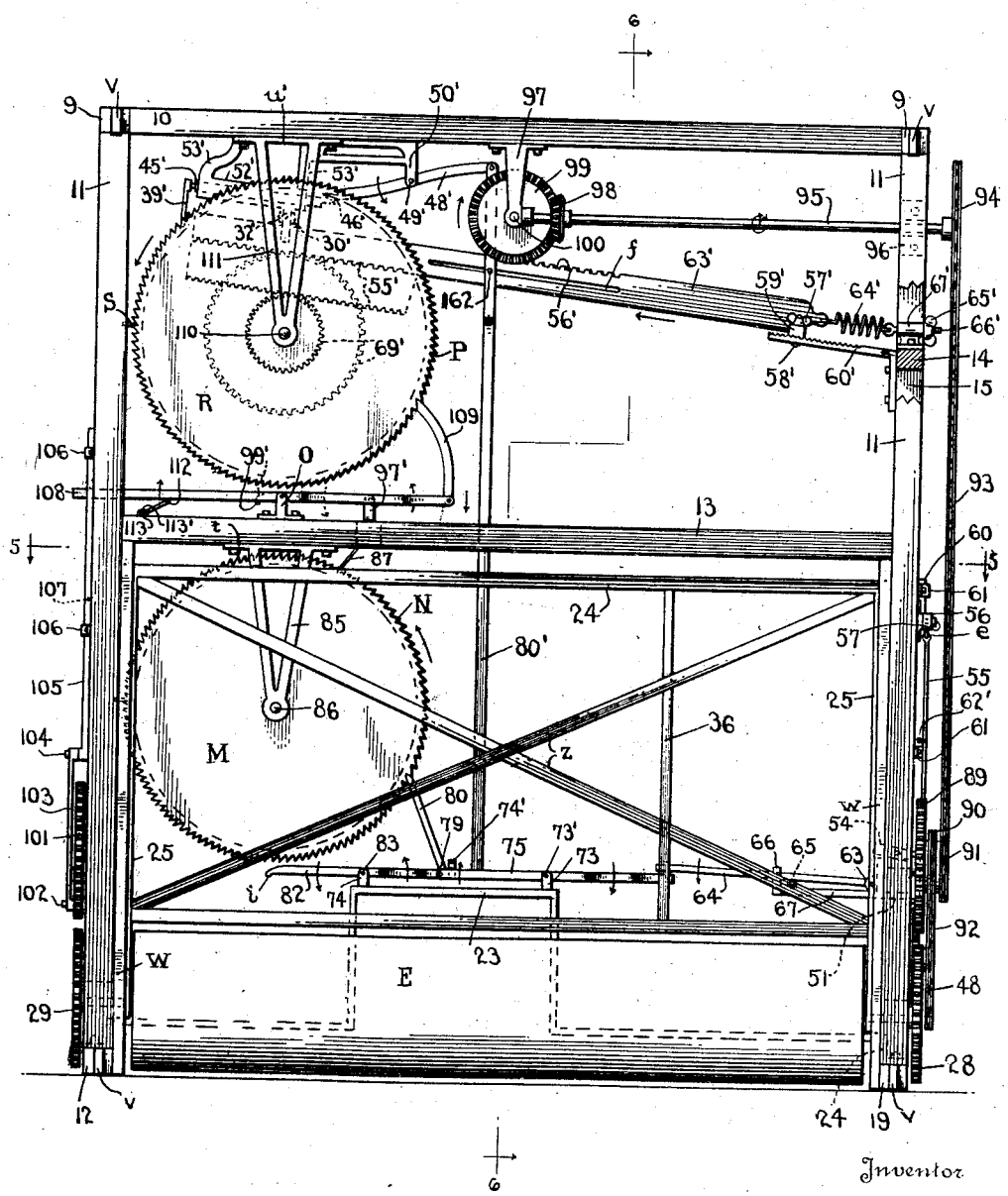
Fig. 4 is an end elevation of the receiving end of the machine.

As shown in Fig. 4, the corner bars 11, are secured by means of the transverse brace bars 13, as shown in Figs. 4 and 7, while connecting the brace bars 13, is the ear bar 16, shown in Fig. 7. Vertically held between the bars 14 and 18, as shown in Fig. 6, is the stop post 15. As shown the frame is further strengthened at the lower end by means of the bridge bars 23, one being clearly shown in Fig. 7. Each bridge bar 23 has the securing ears 24, by means of which these bridge bars are held in parallel spaced relation, as indicated in Fig. 6, and may be securely fixed to the base bars 12 and 19.

The frame described is vertically adjustable between the standards 2.

Each corner bar 11 has secured to it two cleats $w$, shown in Figs. 7 and 6, these being disposed in parallel spaced relation, and between which are slidably held the roller carriages, as used in my invention.

Two roller carriages are employed, one being termed the intake, and the other the exit carriage. The intake carriage shown in Fig. 4, comprises the top part 24, the two side bars 25, the bottom bar 26 and the cross bar $z$. The side bars 25 carry the shaft 27, the ends of which project through slots $p$, within the corner bars 11, as shown in dotted lines in Fig. 6. To the shaft 27, is secured the intake roller E, covered by means of rubber $x$, while the ends of the shaft which project beyond the standards carry the gears 28 and 29. The roller E, forms the main reciprocating member, as used in this machine.

The exit end carriage comprises the top and bottom bars 30, 31, the side bars 32 and the cross bars $u$, shown in Fig. 7; the carriage further gives support to the crank shaft 33, to which is secured the exit roller F, also provided with a rubber coating or cover $x$. The shaft 33 also extends through suitable slots $p$, beyond the cross bars 11. The roller F, will later be referred to as an auxiliary reciprocating member.

Figure 2:
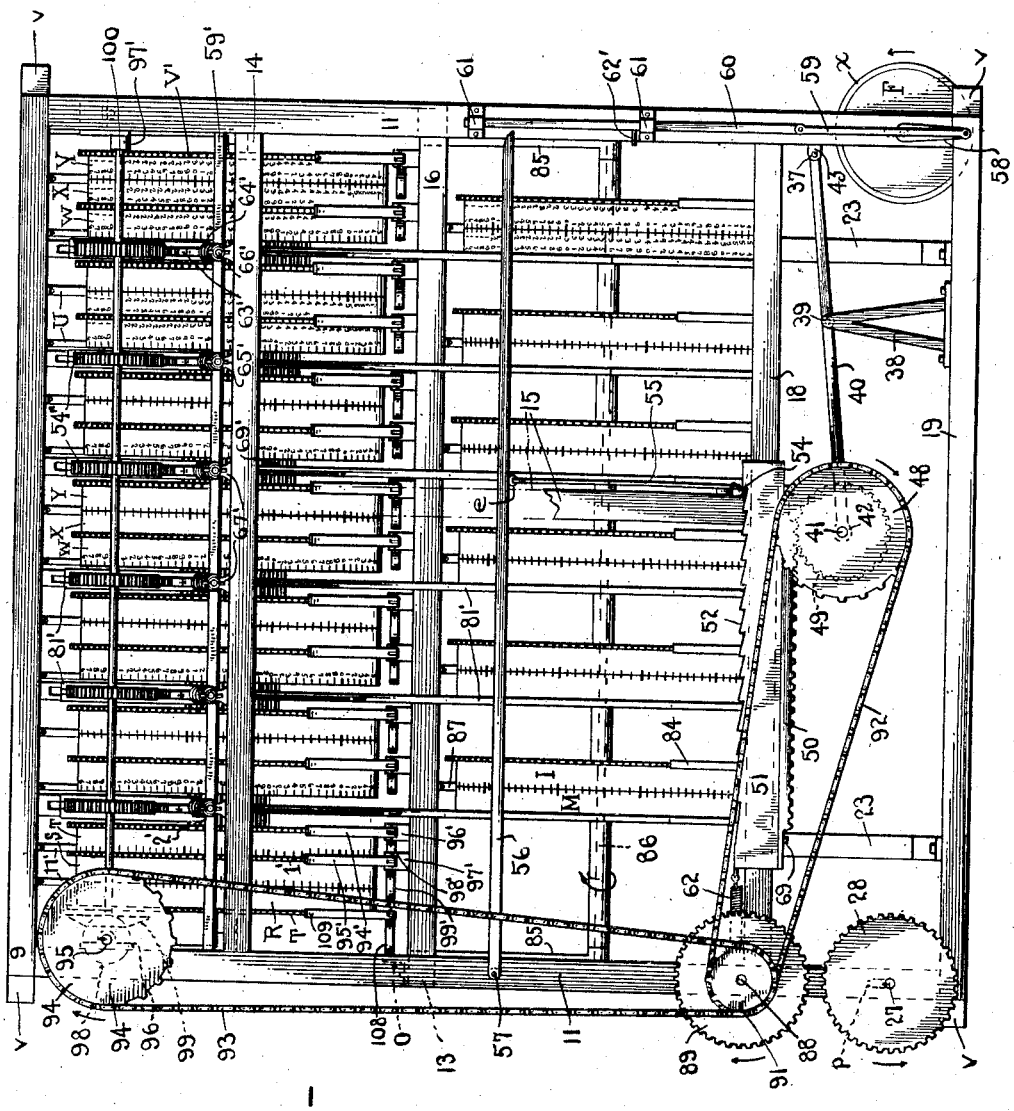
Fig. 2 is a side elevation of the machine with the casing removed.

The intake carriage has the stand 36, shown in Fig. 4, from which projects the drop arm 35, shown in Fig. 5, while the exit carriage has an ear 37 to which is pivotally secured the rock lever 40, held to the bearing bracket 38 by means of the pin 39, as shown in Figs. 2 and 5. As the intake roller E, is raised and lowered it actuates the arm 35, while the raising and lowering of the exit roller rocks the lever 40.

This rock lever 40 at its end has the bearing eye 42, within which is held the forward end of the rock shaft 41, the other end of the rock shaft being carried by the bracket 43, secured to the side bar 11, as shown in Fig. 2. The end of the shaft 41 is provided with the ball 44, held in place by a screw 45, this ball being held to the bracket 43 by means of the cup 46, secured by means of the screws 47. At its forward end, the rock shaft 41 has secured to it the chain gear 48, from the inner face of which extends the rack pinion 49. The gear 48 forms a rotary swinging member.

The pinion 49 is normally in engagement with the timing rack 50, fixed to the bottom of the timing box 51, shown in top view in Fig. 5. The edges 52 of this box have pawl teeth which are held in staggered position. The timing box slides freely upon the bar 18, the movements of the box being limited by the stop post 15. Pivotally held to the post 15, by means of the pin 53, is the rock pawl 54, the ends of which are alternately in engagement with the rack teeth 52. Extending from one end of the rock pawl 54, is the connecting rod 55, which at its upper end is secured to the eye $e$, secured to the striker bar 56, held by means of the pin 57 to a corner bar 11, as shown in Fig. 2.

Secured to the crank 58 fixed to the shaft 33, is the pitman 59 pivotally secured at its upper end to the reciprocating bar 60 held to a corner bar 11, by means of the straps 61, as shown in Fig. 2. The reciprocating bar 60 has the striker pin 62', arranged to contact with the end of the striker bar 56. As the roller F revolves, the bar 60 is reciprocated to actuate the striker bar 56 to rock the pawl 54.

As shown in Fig. 5, the timing box is normally drawn toward the intake end of the machine by means of the spring 62 holding one end secured to a corner bar 11, as shown.

The timing box 51 has the extending ears 63, shown in Fig. 5, carrying a pin $n$, giving pivotal support to the trigger or trip lever 64. This trigger passes through the yoke 66 forming a part of the extension 67, of the lifting box 51, shown in Fig. 10.

The yoke 66, is of a size sufficient so that the trip lever 64 may rock upward and downward. A spring 65 is secured to the under part of the trip lever 64, this spring being shown in dotted lines in Fig. 4.

The rack 50 is yieldingly connected to the bottom of the timing box, as shown in Fig. 10, by means of two bolts 69, which pass through the slots 68, within the ends of the rack 50. This rack 50 has a seat 70 shown in Fig. 11, into which the lug 71 extends, this lug projecting from the bottom of the timing box, while a coil spring 72 is interposed between this lug 71 and one end of the seat 70, so that this rack 50 is yieldingly and slidably held to the timing box.

Figure 3:
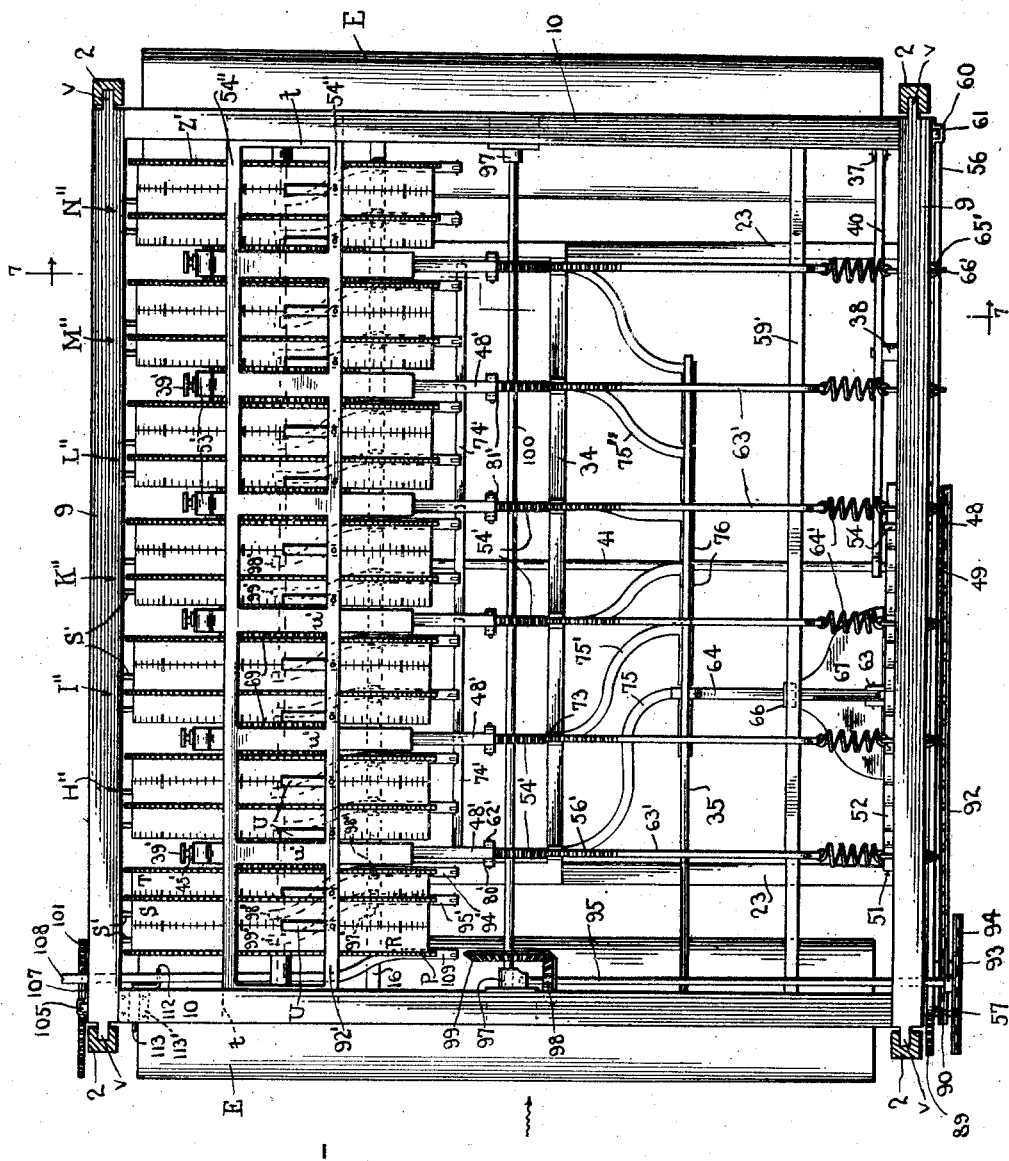
Fig. 3 is a plan view.

Secured to the flanges 34 and 34' of the bridge bars 23 are the ears 73 and 74, the first set giving support to the lower key levers 75, 75' and 75", the first two sets marked 75 and 75' having their stems bent to the right, and those marked 75" having their stems bent to the left, as shown in Figs. 5, 3 and 19. As all of the levers are alike, the description of one will suffice for all. As shown in Fig. 19, each lever has a head 76, the heads of all of the levers being alined, so as to lie squarely below the arm 35; an aperture 77 is provided to receive the supporting pins 73', while the rear end of each lever is bifurcated to provide the apertured terminal ears 78, arranged to receive a pin 79, a stop lip 81 being located between the ears 78, as shown in Fig. 15.

The pins 79 give pivotal support to the pawls 80, shown in Fig. 15 the ends $m$, of which are arranged to engage the ratchet teeth N, of the lower register wheels M, as shown. Every pawl 80 has a stop shoulder 82', arraged to contact with a lip 81, to limit the rearward movement of the pawls.

Pivotally supported upon the pins 83 held within the ears 74 are the stub levers 82, shown in dotted lines in Fig. 5, and each lever 82 has a contact end $i$, held within the path of a pin $r$, which extends from the register wheel M, as shown in Fig. 7. Whenever the wheel M, makes one complete revolution, the pin $r$ depresses the stub lever 82 to advance the register wheel I, one notch. The register wheels I, as shown in Fig. 5, have the ratchet teeth H, these teeth being directly engaged by the pawls 84, pivotally secured to the end of the stub levers as shown by means of the pins $s$.

The wheels M and I, form a unit registering mechanism.

Depending from the bars 13, are the hangers 85 having the securing bases $t$, as shown in Figs. 4 and 7. These hangers give pivotal support to the stationary shaft 86, carrying the spacing collars $g$, and the register disks M and I, the collars $g$, holding the disks in proper spaced relation.

In order to prevent any retrograde movement of the registers M and I, I provide the back springs 87, which are secured to the under face of the bar 16, as shown in Fig. 7, the free ends of the springs sliding upon the graduated faces of the register disks to serve as detents to prevent any casual movement of the disks.

Mounted upon a stud 88 secured to one of the corner bars 11, as shown in Figs. 2 and 5, is the gear 89 arranged at times to be engaged by the gear 28, while secured to this stationary rotating member 89, is the intermediate chain sprocket 90, to which in turn is secured the other chain gear 91. A chain 92 passes over the sprockets 91 and the chain gear 48, while a chain 93 passes over the outer sprocket 91 and the gear 94, fixed to the bevel gear shaft 95, shown in Fig. 4. The shaft 95 is held in front within the bearing 96 shown in Fig. 6 and at its other end in the hanger 97, shown in Fig. 4. The shaft 95 carries the bevel pinion 98 meshing with the bevel gear 99, fixed to the shaft 100 held within the hangers 97 and 97', the latter being shown in Figs. 2 and 7.

As shown, the chain 92 forms a means for connecting the stationary rotating member 89 to the rotating swinging member 48. The chain 93 and shaft 100 form a means to operatively connect said stationary rotating member 89 to the rock pinions 54".

Located above the gear 29 shown in Fig. 4, is a stud 93' revolubly supporting the gear 101 having the wrist pin 102, to which is secured the pitman 103, which by means of a pin 104 is secured to the sliding bar 105 shown in Fig. 9. The bar 105 is slidably secured by means of the straps 106 and carries the striker pin 107 arranged to contact with the projecting end of the main lever 108 shown in Figs. 3 and 4.

This lever is pivotally secured to the gear $o$, fixed to the bar 15 and at its end carries the curved pawl 109, clearly shown in Fig. 4. said pawl engaging the ratchet teeth P, of the disk R, this disk R in connection with the registered disks S and T, shown in Fig. 9, giving grand total of feet of lumber passing through the machine.

As shown in Fig. 3, the disks R and S, are each provided with a projecting striker pin $s'$, these pins being arranged to successively engage the auxiliary levers 99', and 98', shown in Fig. 2, held by the ears 97' and 96'. The lever 99' has the pawl 95', while the lever 98' has the pawl 94', these last two pawls being arranged to engage the ratchet teeth 1' and 2', in the manner shown in Fig. 2.

As shown in Figs. 3 and 7, the springs U, secured to the bars 92' slide upon the disks R, S and T, and hold the same against casual retrograde movement.

As shown in Fig. 5, six sets of registering members M and I', are employed in the lower section wheel; while referring to Fig. 2, it will be seen that the upper register includes seven sets of registering disks, as disclosed; the grand total registers comprise the disks R, S and T, which are actuated through the intermedium of the intake roller E.

Referring to Fig. 5, I have shown six sets of disks each set comprising a disk M and I, the sets being generally indicated by the reference letters H', I, K, L, M' and N'. These registers are arranged to give the total, number of boards of a given length that pass through the machine. The registers beginning with H' respectively register the number of 16, 14, 12, 10, 8 and 6 foot boards that pass through the dressing machine. If desired another set of registering mechanisms could be included, giving the length of 18 foot boards or 4 foot boards. The upper registering disks are secured to the shaft 110 held within the brackets 111.

In the present invention, the six standard lengths of boards have been provided for, of the lengths set forth.

In referring to Fig. 5, it will be noticed that the key levers 75' and 75'' each have a trip end 79' from each of which laterally extends an arm 74' (shown in Fig. 16) having the curved cam under face $a''$, each face being held adjacent the edge of the trip extension of the bar upon the exit end of the machine, as shown in Fig. 5. In Fig. 16, I have shown a detail of one of the trip extensions. These extensions by means of a pin $b''$, are connected to their respective levers. Each trip extension 79' has the ears 78' adjacent to which is located a stop shoulder $c''$, limiting the movement of the extensions which are hinged to, their respective levers.

As shown in Fig. 16, each trip extension has an apertured ear 76' having an opening 73'' by means of which the pawls 84 are connected to the ears 76', the extension 77' forming springs limiting the movement of the pawls 80.

Extending upward from the first lever 75, is the push bar 80', shown in Fig. 5, while extending upward from the adjacent trip extensions 79, are the posts 81', these push bars 81' and 80' actuating the uppermost registering mechanism, which give the total number of feet of each set of boards of a given length that have passed through the machine.

The levers 75, 75' and 75'', are depressed and actuated by means of the traveling trigger 64 and the trigger is depressed by means of the arm 35, which is raised and lowered when the intake roller E, is actuated.

The upper shaft 110, which revolubly supports the registering disks R, S and T, also supports a series of total registering mechanism, there being one total registering set of registers for each of the lower registering sets M and I, these latter showing the total number of boards of a given length that pass through the machine. The upper total registering mechanisms are marked H'', I'', K'', L'', and M'', and are shown in Fig. 3. In Fig. 13, I have shown a detail of the last set of upper total registers used in connection with the 6 foot board registering mechanism.

Each of the upper registering units include two outer graduated registering disks Y and W, and an intermediate registering disk X, these forming what I term the individual total length registering mechanisms.

The disks Y and X have the ratchet teeth V' and Z'. As shown in Figs. 12 and 13, the outer disk W has the ratchet teeth 70', while held adjacent to each ratchet faced disk W is a pawl gear 69', one being shown in detail in Fig. 14. Each of these pawl gears 69' has a plurality of outstanding springs 68', which serve as pawls to engage the ratchet teeth 70'. In Fig. 12, the pawls are shown in engagement with the ratchet teeth. As disclosed, the pawl gears 69' are very much smaller than the disks W, X and Z, so that there is formed a space between the adjacent disks V and W.

The pawl gears 69' of which there are six used in the machine shown, are of progressively greater diameter, and in Fig. 4, I have shown the first gear in full, and the last in dotted outline.

Secured to the intermediate bar 14, as shown in Figs. 4 and 7, are the sleeve arms 67', each of which carries a screw eye 66', to the end of which is secured a wing-nut 65'. To the eyes of these screws are connected the springs 64' which in turn have their ends secured to the forward end of a slotted duplex rack bar 63', a broken end view of one being shown in Fig. 17. There is one duplex rack bar 63' for each pawl gear 69'.

Each rack bar 63' has a lengthwise extending slot $f$, within which is held a screw 162 secured to a push bar 80', so that as these posts are raised, they raise the rack bar 63' carrying one rack out of working engagement, and bringing the other into working engagement.

Fixed to the corner bars 11, 11 opposite the registering disks or wheels, as shown in Figs. 4 and 7, are the slotted rack face brackets 60', upon which is held the stop bar 59'. Each rack bar 63' has an end seat to engage the stop bar 59' in the manner shown in Fig. 7.

The bars 63' have an upper rack 56' and a lower rack 55', clearly shown in Fig. 7. As the screws 162 which are fixed to the upper ends of the posts 80' are alined, and as the racks 56' are all an equal distance away from the gears 54'', the lower racks 55', are a correspondingly greater distance away from their upper edges, owing to the fact that the gears 69' are of a progressively greater diameter. I have shown the last rack bar 63' in Fig. 7, and in Fig. 4, the first rack bar, which is also shown in broken detail in Fig. 18.

Secured to the end bars 12, is the barrel frame 54' having the cross plates $u'$, from which extends the arms, 53'', 53', which in turn carry the open ended barrels 52' arranged to slidably hold the spring pressed plungers 45', this construction being shown in Fig. 17.

As shown, the ears 50' have a pin 49' which pivotally supports the rock arms 48' there being one rock arm employed in connection with each duplex rack bar 63'. Each rock arm 48' ends in a cam nosing 46' having the upper seat $o'$, clearly shown in Fig. 17.

Slidably held within each barrel 52', is a latching plunger 45' having an extending nosing $p'$, arranged for co-action with the nosing 46'. The bores within the barrels 52' are square in cross section, so as to hold the latching plungers 45' rectangular in cross section. Each plunger 45' has a seat 43' to which is held a spring 44', a screw 51 passing through the barrels 52' and entering the seat 43' the springs 44' working against the screws 51' and the plungers 45' to hold said plungers in protractile position against the tension of the springs 43'. As shown in Fig. 17, each plunger 45' has a downwardly extending trip finger 39', these fingers arranged to contact with the ends of the duplex rack bars 63' in one position of said rack bars.

In order to hold the lower racks 55' to the gears 69', I employ the rollers 30' held upon the pins 31' carried by the ears 32' these ears 32' extending from the barrels 52' as shown in Fig. 17. The rear upper edges of the duplex rack bar 62 are normally in contact with these rollers 30'.

The upper registering disks are secured to the shaft 110 held within the brackets 111. The whole machine is protected by means of the shields C and D, supported by means of the hinges 8, shown in Fig. 1.

In starting the machine, the same is raised and adjusted according to the thickness of the boards that are to be tallied, the machine being raised by means of the hand wheels 6. The machine having been raised to take the proper thickness of board, the total register mechanism must be properly adjusted to give an accurate tally for the proper thickness of boards. This is accomplished in setting the stop bar 59' so that the required rotary movement is imparted to the pawl gears 59'.

The operation of my machine is as follows:

As the board enters the machine it raises the intake roller E, which results in the carriage carrying the roller being raised to raise the arm 35. At the same time, the gear 28 is brought into mesh with the gear 89, rotating the connected outer chain sprocket 91, which is in chain connection with the chain gear 48, as shown in Fig. 2. The timing box 51 is then carried forward against the tension of the spring 62, as the rock pinion 48 actuates the rack 50. As the timing box advances, it intermittently actuates the rock pawl 54, which serves as a detent to prevent the retrograde movement of the timing box. In the meantime, the trigger 64 has been advanced traveling successively over the key heads 76 of the levers 75, 75' and 75''.

In the present machine, the distance between the rollers E and F, is taken as being two feet, and the first two feet of every board passing beneath the roller E advances the timing box 51 its full forward stroke against the tension of the spring 62. By this time, the forward end of the board has come into contact with the exit roller F, and raised the same resulting in the rock lever 40 being tilted to throw the rack pinion 49 out of engagement with the rack 50 to stop the advance of the timing box.

Now as the exit roller F is rotated, it reciprocates the bar 60 to bring the striker pin 62' successively into engagement with the striker bar 56, the pin 62' striking the bar 56, once every revolution. As the striker bar 56 is actuated, it rocks the pawl 54 up and down, so that the pawl successively engages the opposite rack edges or pawl teeth 52, to permit the step by step retrograde movement of the timing box 51, which is pulled back by means of the spring 62. As the timing box travels back, it successively and step by step carries the trigger 64 over the heads 76 of the key levers 75, 75' and 75''.

Now as the machine is so timed that when a 6 foot board has passed below the roller E, this roller will cease revolving owing to the fact that the rear end of the board J will drop over the edge of the lumber chute A upon the top a, of the table A'. As the board drops, both rollers E and F are dropped to instantly check the operation of the talley machine for the reason that the wheels 39 and 28 then become disconnected.

We will assume that an 8 foot board had passed through the tally machine, which would bring the trigger 64 over the intermediately positioned key lever 75''. As the intake roller carriage drops, the connected arm 35 also drops, carrying the trigger 64 downward to actuate the intermediately positioned lever 75'', to carry the pawl 80 upward to rotate the registering disk M, one notch to disclose that one 8 foot board has passed through the machine.

The registers are all visible through suitable openings in the shield D. The registering disks M and I, are of such a size that each may receive one hundred numbers, the first disk registering the numbers from 0 0 to 99, and after this disk has made a complete revolution, the next disk is brought into action.

During the entire time that the intake roller E which is of a predetermined and known diameter rotates, it continuously actuates the grand total registering mechanism including the disks R, S and T, this being accomplished through the main lever 108, which is actuated as long as the board is passing through the machine, thus registering every foot of board passing through the tally machine.

In the operation described of the passing of an 8 foot board through the tally machine as the trigger 64 descends to trip the key lever 75'', the raising of the trip end 79' of the lever raises the contacting post 81', resulting in the connected duplex rack bar 63' being brought into engagement with the adjacent rack pinion 54'' secured to the top shaft 100, as shown in Fig. 17. At the same time that the rack bar 63' is raised, the arm 48' is rocked so that the nosing 46' shoves the square plunger 45' back against the tension of the spring 41' so that the nosing 46' will lock below the nosing p, as shown at o', in Fig. 17. In this position of the rock arm 48', the rack bar 63' is in mesh with the pinion 54. However the operation that tilted the rock arm 48' to upset the same, put the machine out of operation, so that the insertion of a subsequent board will be necessary to operate the registering mechanism to register the total number of feet of the board last passing through the machine. On introducing any board irrespective of length, the operation described will take place, while as soon as the gear 69 is rotated it will actuate the shafts 95'' and 100 to operate the rack bar 63'. As the rack bar 63' is advanced to rotate the connected register disks 69' to count the total length the end of the rack bar at the instant that the total length is counted, contacts with the finger 39'' pushing the plunger 45' backward to permit the dropping of the rock arm 48' so that the post 80' is permitted to drop down and to contact with its key.

As the distance between the heads 76 is less than the thickness of the trigger 64, whenever this trigger strikes two members, one shoves the other out, this being done through the means of the arms 74', shown in Fig. 16. So also whenever one of the key levers 75, 75' and the two inner levers marked 75'' are actuated, all the remaining keys located toward the exit end of the machine are put out of working order, so that their pawls 84 will not register.

The heads 76 are of a predetermined length so that a board slightly longer than regulation length will be counted as of a standard length, so that a board 9 feet 11 inches long will be registered as a 9 foot board. Should the board be nine feet twelve inches long the trigger 64 will have been carried over the next head 76 to register the ten foot board. As has been explained, boards of various thickness must be tallied by the machine, which makes it necessary to adjust the grand total register, so that when a two inch thick board passes through, it will be registered as two boards of one inch thickness.

This change in the grand total registering mechanism is accomplished in providing the bar 13, shown in Fig. 9 with a bearing 113' carrying a crank shaft 113, having the cranks 112, arranged to lie below the main lever 108. The shaft 113 has a handle 115 with a spring pressed pin 116, arranged to seat within the graduations of the disk or dial 114', as shown in Fig. 8. One-foot sizes between regulation lengths are not accounted for so that a seven-foot board will be registered as a six-foot board, and a seven-foot one-inch board will be registered as an eight-foot board.

The boards passing through the machine must drop a distance sufficient so that the descending rollers E and F, will disengage their respective gears from the gears 101 and 89. A mechanism is provided to hold the boards in a horizontal plane, while passing through the machine, so that both rollers E and F will drop simultaneously, as will be described hereinafter. So also is a mechanism provided by means of which one or more of the keys may be carried out of working position manually.

While I have described and shown the keys 75'' with the trip ends 79' arranged beyond the pivot point as shown in Fig. 5, the construction may be such that the pivot point is in front of the ear 73', so that the forward ends of the levers only will be actuated.

While the roller E is first to be released in order that the board tallied will drop away from both rollers E and F at the same instant, I provide a special mechanism shown in Figs. 21, 22 and 23. The table a, at suitable points is provided with the oppositely positioned slots 220 and 221. Held within these slots are the rollers 200 and 201 carried respectively upon the shafts 203 and 202. The shaft 203 is held within the upper ends of two oppositely positioned rock arms 204, which at their lower ends, by means of suitable studs 205, are pivotally secured to two oppositely positioned bearing members, 206. Each arm 204, carries a pin 207, arranged to receive the bifurcated head 208, formed at the end of the connecting rod 209, its other end being secured to the turn buckle 210, which also supports the connecting rod 211, having the bifurcated head 212. Each head 212, by means of a suitable pin 213, is adjustably secured to a rock lever 214, to the end 215 of each of which is adjustably secured a counterpoise or weight 217. These rock levers 214, are disposed in sets of two and are opposite the rock arms 204, and at their upper ends give support to the shaft 202, to which the roller 201, is fixed, as shown in Fig. 21. The levers 214 are held upon the studs 216 supported at the ends of the brackets 218.

Extending from each bracket 218 is a curved stop arm 219, which limits the movement of the levers 214, in one direction. The weights 217 serve to yieldingly hold the members 214 to the stop arms 219.

In the passage of a board J, through the tally machine, the board slides over the roller 200, the instrumentalities being so arranged that the roller 202 will slightly contact with the passing board. The opposite roller 201 is so adjusted that its uppermost edge will lie in a plane coincident with that of the table A. As the board passes under the tally machine, the board has a tendency to shove the roller 201 and its connected levers 214 toward the discharge end of the table and so assist in holding the levers 214 against their stops.

In referring to Fig. 21, it will be noticed that the shaft 203 is located a little to one side of the vertical plane passing through the stud 205, so that as the board J leaves the end of the table A, its weight together with that of the roller E, and its connected mechanisms, will force the roller 200 down. As this roller drops, the roller 201 is drawn toward the roller 200 so that both rollers simultaneously drop with the board. The rollers E and F are thus simultaneously checked in their revolutions.

As soon as the board passes beyond the table A, the weight 217 which yieldingly holds the levers to the stops again brings the rollers into their proper position.

While I have shown a weight it should be understood that a spring could be used to yieldingly hold the members 214 to the stops. By means of the turn buckles 210, and the pins 207 and 213, the connecting means can be accordingly adjusted so that both the intake and exit rollers will simultaneously cease their operations.

A machine constructed according to my invention is simple and inexpensive in construction, positive of operation, and the adjustments may be effected with ease, accuracy and despatch.

Having thus described my said invention what I claim as new and desire to secure by United States Letters Patent is:—

1. In a machine of the character described, a main reciprocating member, a stationary rotating member, a slidably held spring pressed timing rack, means to connect said timing rack to said rotating member, a rotating swinging member at times in engagement with said timing rack, and a rock lever carrying said rotating swinging member.

2. In a machine of the character described, a main reciprocating member, a stationary rotating member, a slidably held spring pressed timing rack, means to connect said timing rack to said rotating member, a rotating swinging member at times in engagement with said timing rack, a rock lever carrying said rotating swinging member, and an auxiliary reciprocating member connected to said rock lever.

3. In a machine of the character described, a main reciprocating member, a stationary rotating member, a slidably held spring pressed timing rack, means to connect said timing rack to said rotating swinging member at times in engagement with said timing rack, a rock lever carrying said rotating swinging member, an auxiliary reciprocating member connected to said rock lever, and a rock pawl in engagement with said timing rack.

4. In a machine of the character described, a main reciprocating member, a stationary rotating member, a slidably held spring pressed timing rack, means to connect said timing rack to said rotating member, a rotating swinging member at times in engagement with said timing rack, a rock lever carrying said rotating swinging member, an auxiliary reciprocating member, connected to said rock lever, a rock pawl in engagement with said timing rack, a striker bar intermittently actuated by said auxiliary reciprocating member, and means to connect said striker bar to said rock pawl.

5. In a machine of the character described, a main reciprocating member, a stationary rotating member, a slidably held spring pressed timing rack, means to connect said timing rack to said rotating member, a rotating swinging member at times in engagement with said timing rack, a rock lever carrying said rotating swinging member, an auxiliary reciprocating member, connected to said rock lever, a rock pawl in engagement with said timing rack, a striker bar intermittently actuated by said auxiliary reciprocating member, means to connect said striker bar to said rock pawl, a trigger secured to said timing rack, and a unit registering mechanism actuated by said trigger.

6. In a machine of the character described, a main reciprocating member, a stationary rotating member, a slidably held spring pressed timing rack, means to connect said timing rack to said rotating member, a rotating swinging member at times in engagement with said timing rack, a rock lever carrying said rotating swinging member, an auxiliary reciprocating member, connected to said rock lever, a rock pawl in engagement with said timing rack, a striker bar intermittently actuated by said auxiliary reciprocating member, means to connect said striker bar to said rock pawl, a trigger secured to said timing rack, a unit registering mechanism and a key lever to actuate said registering mechanism engaged at times by said trigger.

7. In a machine of the character described, a main reciprocating member, a stationary rotating member, a slidably held spring pressed timing rack, means to connect said timing rack to said rotating member, a rotating swinging member at times in engagement with said timing rack, a rock lever carrying said rotating swinging member, an auxiliary reciprocating member connected to said rock lever, a rock pawl in engagement with said timing rack, a striker bar intermittently actuated by said auxiliary reciprocating member, means to connect said striker bar to said rock pawl, a trigger secured to said timing rack, a unit registering mechanism, a key lever actuating said registering mechanism, said trigger arranged to strike said key lever, and a drop arm actuated by said main reciprocating member and contacting with said trigger.

8. In a machine of the character described, a main reciprocating member, a stationary rotating member, a slidably held spring pressed timing rack, a rotating swinging member arranged at times to engage said timing rack, an auxiliary reciprocating member actuating said swinging rotating member, and means to operatively connect said rotating swinging member to said stationary rotating member.

9. In a machine of the character described, in combination, a main reciprocating member, a stationary rotating member, a slidably held spring pressed timing rack, a rotating swinging member arranged at times to engage said timing rack, and an auxiliary reciprocating member actuating said swinging rotating member.

10. In a machine of the character described, in combination, a main reciprocating member, a stationary rotating member, a slidably held spring pressed timing rack, a rotating swinging member arranged at times to engage said timing rack, an auxiliary reciprocating member actuating said swinging rotating member, means to operatively connect said rotating swinging member to said stationary rotating member, and a rock pawl engaging said timing rack.

11. In a machine of the character described, a main reciprocating member, a stationary rotating member, a slidably held spring pressed timing rack, a rotating swinging member arranged at times to engage said timing rack, an auxiliary reciprocating member actuating said swinging rotating member, means to operatively connect said rotating swinging member to said stationary rotating member, a rock pawl engaging said timing rack, a striker bar intermittently actuated by said auxiliary reciprocating member, and means to connect said striker bar to said pawl.

12. In a machine of the character described, a main reciprocating member, a stationary rotating member, a slidably held spring pressed timing rack, a rotating swinging member arranged at times to engage said timing rack, an auxiliary reciprocating member actuating said swinging rotating member, means to operatively connect said rotating swinging member to said stationary rotating member, a rock pawl engaging said timing rack, a striker bar intermittently actuated by said auxiliary reciprocating member, means to connect said striker bar to said pawl, a key lever, and a trigger secured to said timing rack arranged to contact with said key lever.

13. A registering wheel, a pawl gear in connection with said registering wheel, a duplex rack bar in normal engagement with said pawl gear, a rack pinion, a push bar in engagement with said pinion and at times engaged by said key lever, a rock arm pivotally connected to said push bar, a spring actuated latching plunger arranged for coaction with said rock arm to hold said duplex rack bar to said rack pinion, and a finger extending from said latching plunger actuated by said rack bar to release said rock arm.

14. In a machine of the character described, and in combination, a duplex rack bar, a rack pinion, a push bar, a rock arm pivotally connected to said push bar, a spring actuated latching plunger arranged for coaction with said rock arm to hold said duplex rack bar to said rack pinion, and a finger extending from said latching plunger actuated by said rack bar to release said rock arm.

15. In combination, a gear, a duplex rack bar one rack of which is in normal engagement with said gear, a rack pinion adjacent to the other rack, a bar slidably connected to said duplex rack, means to actuate said bar, a rock arm pivotally connected to said bar, a spring actuated latching plunger arranged for co-action with said rock arm, a trip finger secured to said latching plunger, and means to actuate said rack pinion to carry said rack against said finger to actuate said plunger to release said rock arm.

16. In a machine of the character described, a main reciprocating member, a stationary rotating member, means to bring said reciprocating member into operative engagement with said stationary member, a slidably held spring pressed timing rack, a rotating swinging member, a gear carried by said rotating swinging member, a rack secured to said timing rack engaged at times by said gear, a rock lever pivotally connected to said rotating swinging member, an auxiliary reciprocating member operatively connected to said swinging member, and means to connect said stationary rotating member to said swinging rotating member.

17. In a machine of the character described, a reciprocating main roller, a gear secured to said roller, a suitably held gear, said first mentioned gear arranged at times to engage said suitable gear, a rotating swinging member, means to operatively connect said rotating swinging member to said suitable gear, a rock lever secured to said rotating swinging member, an auxiliary reciprocating roller, means connecting said auxiliary roller to said rock lever, a timing rack, a pawl normally engaging said timing rack, a rack secured to said timing rack, a gear carried by said rotating swinging member arranged at times to engage said last mentioned rack, a striker arm, means operated by said auxiliary member for intermittently engaging said striker arm, and means connecting said striker arm to said pawl.

18. In a machine of the character described, and in combination, a timing rack, a pawl engaging said timing rack, a rack bar secured to said timing rack, a swinging member, a gear carried by said swinging member arranged at times to engage said rack bar, a striker member, and means for engaging said striker member to actuate said timing rack.

19. In a machine of the character described, a main reciprocating roller, a gear secured to said main reciprocating roller, a suitable gear engaged at times by said first mentioned gear, a sprocket secured to said stationary gear, a rock lever, a chain gear secured to said rock lever, a chain passing over said gear and pinion, an auxiliary reciprocating member connected to said rock lever, a slidably held timing rack, a rack secured to said timing rack, a rack pinion secured to said chain gear arranged at times to engage said last mentioned rack, a trigger secured to said timing rack, a plurality of key levers each having an extending head, said trigger arranged to successively pass over said heads, a unit registering mechanism operated by each of said key levers, and a top arm arranged to contact with said trigger actuated by said reciprocating roller.

20. In combination, a main reciprocating member, a sliding timing member, means actuated by said reciprocating member to impart a forward movement to said timing member, an auxiliary reciprocating member, means actuated by said auxiliary member to disconnect said advancing member from said timing member, and means to impart a step by step movement to said timing member.

21. In combination, a main reciprocating member, a sliding timing member, means actuated by said reciprocating member to impart a forward movement to said timing member, an auxiliary reciprocating member, means actuated by said auxiliary member to disconnect said advancing member from said timing member, and means to impart a step by step retrograde movement to said timing member.

22. In a machine of the character described, a duplex rack bar, an arm actuated by said member, a duplex spring pressed rack actuated by said member, a rock pawl successively engaging said two racks, a trigger carried by said duplex rack, engaged at times by said arm, a plurality of registering wheels, a key lever for each registering wheel, a pawl carried by each lever to actuate a registering wheel, said trigger successively passing over said levers, and means to actuate said pawl to reset said duplex rack bar.

23. In a machine of the character described, the combination with a vertically reciprocating member, of a stationary rotating member, said reciprocating member at times contacting with said stationary rotating member, a timing member, a rotating swinging member, means to revolubly connect said swinging member to said stationary member, mechanism to detachably connect said swinging member to said timing member said swinging member imparting a forward movement to said timing member, an auxiliary reciprocating member, means to connect said auxiliary member to said mechanism, and means actuated by said auxiliary member to impart a step by step retrograde movement to said timing member.

24. In a machine of the character described, the combination of a reciprocating roller, a stationary gear, a gear carried by said reciprocating member arranged at times to mesh with said stationary member, a bar reciprocated by said stationary member, a striker pin carried by said bar, a key lever, a registering wheel actuated by said key lever, and means to hold said key lever in adjusted relation to said striker pin.

25. In a machine of the character described, a plurality of key levers, means to depress said key levers one at a time, a trip end pivotally secured to each lever, a pawl carried by each trip end, a registering wheel engaged by each pawl, and an arm extending from each trip end arranged to contact with the trip end of the lever upon one side of the arm.

26. In a machine of the character described, the combination of an intermittently actuated reciprocating member, a timing rack advanced by said member, a detent to lock said timing rack at the end of its stroke, a pawl and means to intermittently actuate said pawl to impart a step by step retrograde movement to said timing rack.

27. The combination with a support, of oppositely positioned sets of bearing members secured below said support, two arms pivotally secured to one set of bearing members, a roller carried at the upper end of said arms, two pivotally held rock levers secured to the other set of bearing members, a roller carried at the upper end of said rock levers, means to adjustably connect said arms to said levers, and a stop limiting the movement of said levers in one direction.

28. The combination with a support, of oppositely positioned sets of bearing members secured below said support, two arms pivotally secured to one set of bearing members, a roller carried at the upper end of said arms, two pivotally held rock levers secured to the other set of bearing members, a roller carried at the upper end of said rock levers, means to adjustably connect said arms to said levers, a stop limiting the movement of said levers in one direction, and means to yieldingly hold said levers to said stop, said rollers in one position projecting above the top of said support.

In testimony whereof I affix my signature, in the presence of two witnesses.

JUNIUS W. $\times$ BUTLER.
his mark

Witnesses:
L. M. WHITE,
J. R. SIMMONS.

Copies of this patent may be obtained for five cents each, by addressing the "Commissioner of Patents, Washington, D. C."